Oct. 6, 1925.
D. R. BOWEN ET AL
1,555,825
MACHINE FOR TREATING RUBBER AND SIMILAR MATERIAL
Filed Jan. 6, 1921    2 Sheets-Sheet 1
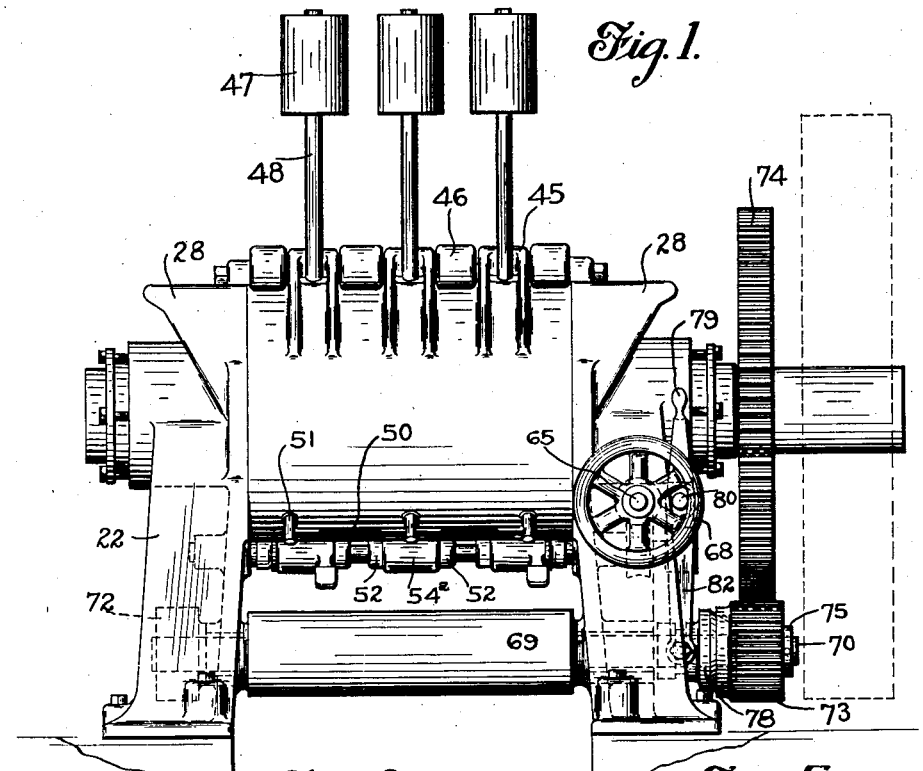
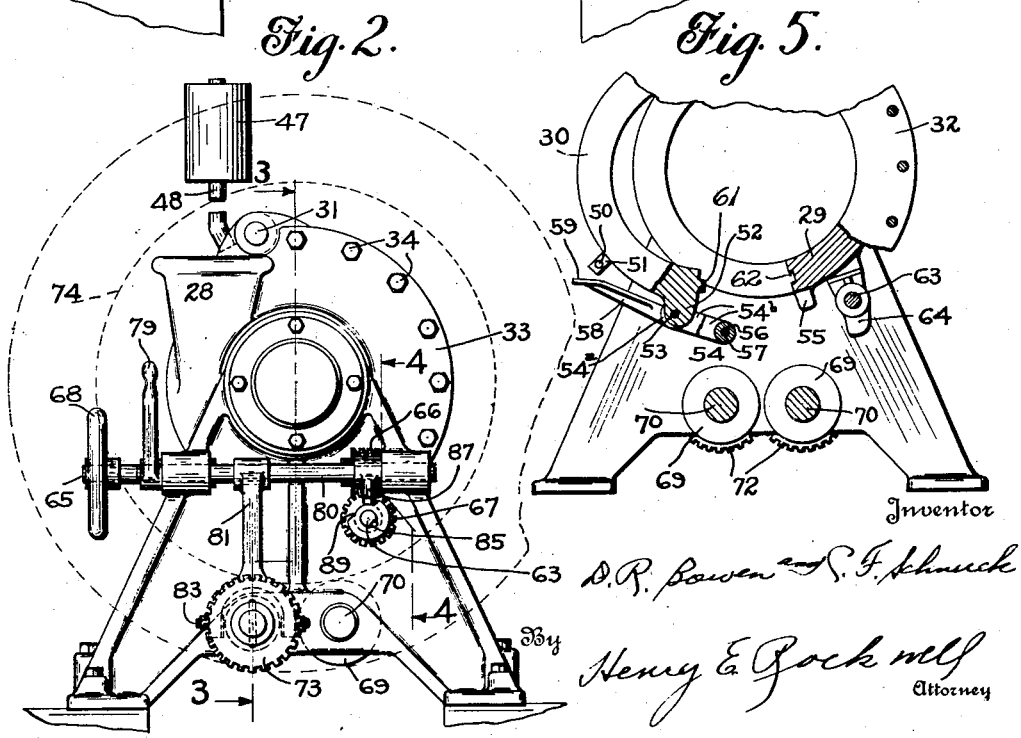

Oct. 6, 1925.  1,555,825
D. R. BOWEN ET AL
MACHINE FOR TREATING RUBBER AND SIMILAR MATERIAL
Filed Jan. 6, 1921   2 Sheets-Sheet 2
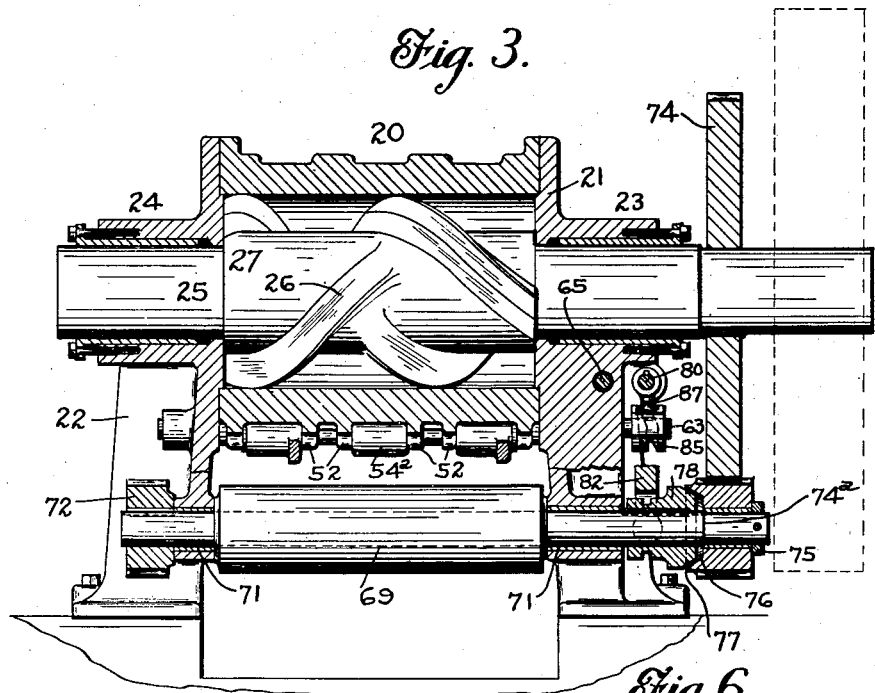
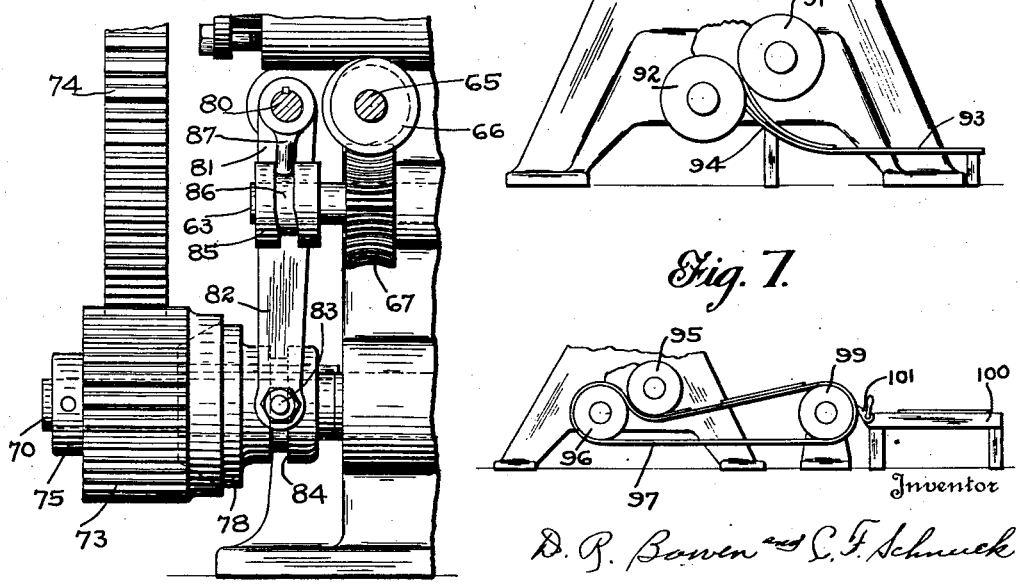
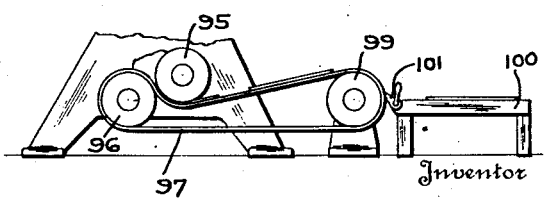

Patented Oct. 6, 1925.

1,555,825

UNITED STATES PATENT OFFICE.

DAVID REES BOWEN, OF ANSONIA, AND CARL F. SCHNUCK, OF NEW HAVEN, CONNECTICUT, ASSIGNORS TO FARRELL FOUNDRY & MACHINE COMPANY, OF ANSONIA, CONNECTICUT.

MACHINE FOR TREATING RUBBER AND SIMILAR MATERIAL.

Application filed January 6, 1921. Serial No. 435,435.

*To all whom it may concern:*

Be it known that we, DAVID R. BOWEN and CARL F. SCHNUCK, both citizens of the United States, the first residing in Ansonia and the second residing in New Haven, county of New Haven, State of Connecticut, have invented certain new and useful Improvements in Machines for Treating Rubber and Similar Material, of which the following is a full, clear, and exact description.

This invention pertains to rubber mixers and like machines and it has particular reference to a machine for compounding rubber usually in the form of fairly large chunks with filling and coloring material in powdered form with the object of producing a smooth, substantial mass in which the distribution of the ingredients is as nearly uniform as possible. A machine of this general character is disclosed in our prior Patent No. 1,496,620 granted June 3, 1924, the mixing being obtained by working a batch of material back and forth in a mixing and working chamber.

The present improvements relate particularly to improved means for discharging the batch of material from the working chamber, and one of the primary objects of this invention is to provide an efficient rubber mixer and like machine having provision for sheeting the rubber previous to its complete discharge from the machine. The sheeting of the material at this time will obviate a separate sheeting operation in another machine, which has heretofore been the usual procedure.

Another object of our invention is to provide a rubber machine of the type set forth, in which the sheeting rolls will be of extended length and will be in position to cooperate directly and effectively with the means for discharging the patch of material from the working chamber.

Another object of the invention is to provide an improved operating means for the sheeting rolls and to provide an improved controlling means for controlling the rotation of these rolls.

A still further object of the invention is to provide a rubber mixer of the type described, with improved sheeting means, which will be located in position to cooperate with the discharge opening in the chamber, and which will extend throughout the length of the chamber, so that the material discharged therefrom will be readily disposed of by the large roll surface presented.

The invention also contemplates the provision of a controlling means for the operation of the rolls by which the rotation of the rolls may be effected when desired, and when such rotation is not desired, the rolls may be thrown out of operation and may remain idle; this controlling means may be operated independently of the discharging means of the chamber, and may also be so arranged that the opening of the chamber to discharge the material will set the rolls into operation.

To these and other ends, the invention consists in the novel features and combinations of parts to be hereinafter described and claimed.

In the accompanying drawings:

Fig. 1 is a front elevation of a rubber mixer embodying our improvements;

Fig. 2 is an end elevation of the same;

Fig. 3 is a sectional view on line 3—3 of Fig. 2;

Fig. 4 is a detail sectional view on line 4—4 of Fig. 2;

Fig. 5 is an end elevational view partly in section of the rubber mixer with one of the supports removed.

Figs. 6 and 7 are detail views of modified forms of sheeting means to be used in connection with rubber mixers of the type described.

We have shown our improvements as applied to a machine of the single cylinder type, having a single rotor provided with blades for working the material back and forth in a substantially cylindrical working chamber; but in certain aspects of the invention the latter is applicable to machines of other types.

In the drawing, the working chamber is shown as provided within a substantially cylindrical casing 20 having end frames or heads 21 at the ends. These end frames or heads are bolted to the cylindrical part of the casing and are provided with supporting pedestals 22 which support the casing from the floor. Journalled in bearings 23, 24 on the respective heads is a shaft 25, provided with blades 26, and constituting a rotary element or rotor for working the material in the working chamber. The blades 26 are so formed and arranged that as the shaft 25 rotates continuously in one direction, the material in the chamber is picked up by the blade or blades in one chamber end, and, while being forcibly pressed and worked against the inner periphery of the chamber, is moved toward and past the center of the chamber into the other end portion thereof, while simultaneously the material in the last named end of the chamber, while being similarly worked against the inner periphery of the chamber, is forced or moved in an approximately reverse direction. In this manner, the material while being worked, is alternately moved back and forth in the chamber. In the embodiment illustrated, the blades are formed upon the cylindrical surface of a hub portion 27 on the rotor, which is of greater diameter than the bearing portions of the rotor shaft and which extends from one end of the chamber to the other, as shown in Fig. 3.

In the machine under discussion, the material or materials to be treated are charged into the working chamber from hoppers 28 carried by and forming portions of the respective heads 21, the two heads being substantially identical. By means of these hoppers 28, the material can be fed through one or both of the end walls or heads of the working chamber, at the upper part of the chamber. The working chamber is divided longitudinally into sections, in this particular case, one section being hinged to the other at the upper portion of the casing. One section is fixed relatively to the heads, but the other section can be swung on its hinge or pivot in such a manner as to provide for the discharge of the material from the casing at the bottom of the latter, as hereinafter more particularly described. In the embodiment illustrated, the fixed part of the casing is shown at 29 and the movable part at 30. A longitudinal pintle 31, by means of which said sections are hingedly interconnected, is located at the upper part of the casing, as shown in Fig. 1. The respective end portions of the fixed section 29, which in this particular instance is substantially semi-circular in cross-section, are suitably secured to the heads 21, for which purpose section 29 is provided with end flanges 32, and heads 21 are provided with flanges 33, to which the respective flanges 32 are secured by suitable means such as bolts 34.

In the form shown, the working face of each blade is provided with a plurality of flats or facets arranged at different angles, as this form of blade has been found to give superior results in gripping the material against and working it on the inner periphery of the working chamber. It will be understood that the blades are arranged at an angle on the shaft, so as to produce the working of the material towards the center of the chamber, and that the several facets referred to extend substantially longitudinally of each blade. Each blade extends from the end of the chamber past the middle thereof, and the blades in one end of the chamber are aligned in a plane substantially at right angles to a plane passing through the diametrically arranged blades in the other chamber end. It will be understood, however, that we do not limit ourselves to the specific number or arrangement of blades disclosed.

In the particular embodiment shown, the casing sections 29, 30 are semi-cylindrical in shape, and each of them is provided at the top with a series of lugs through which the previously mentioned pintle 31 passes for making the hinged connection. The lugs on casing section 30 are shown at 45, the same being preferably cast integral with the said section and extending upwardly from the upper edge portion thereof. Somewhat similar lugs 46 are cast on the fixed casing section 29 so as to alternate with the lugs 45, and the pintle 31 passes through registering holes in all of the lugs, substantially from one end of the cylinder to the other. In the form shown, there are four lugs on the fixed section and three lugs on the hinged section. It will be observed, also, that in this particular instance, the point of hinging, or in other words, the axis of the pintle, is offset laterally, to a certain extent, relatively to the axis of the rotor, and is placed slightly in front of a vertical plane passing through the rotor axis. The result of this arrangement is that the hinged section 30 tends to hang by gravity in an open position with its lower edge at some distance from the lower edge of section 29. The line of meeting between the lower edges of the sections, when the working chamber is closed, lies somewhat to the rear of a vertical plane passing through the rotor axis, and the means for locking the two sections together during the operation of the machine is associated with the lower edges of the sections, as hereinafter described.

A suitable counterweighting means is provided which in the form shown comprises three counterweights 47, each of the same being mounted on the upper end of a rod 48, which rods are associated with the respective lugs 45, as shown more particularly in Fig. 1. The rods 48 are approximately vertical, their lower ends being secured to the section 30 slightly in front of the pintle 31, as shown in Fig. 2. The counterweights are located at the opposite side of pintle 31 from the hinged casing section and overbalance the same to a slight extent so as to hold the hinged casing section normally in the closed position. When the locking mechanism of the casing is released, the casing will automatically open to the extent requisite for the expeditious discharge of the treated material, owing to the pressure of the material against the hinged casing section. We do not limit ourselves, however, to an arrangement wherein the movable casing section is normally held by the counterweights in the closed position, as in some cases it may be advantageous to have the counterweights hold said section normally in a definite open position.

A handle bar 50 extending lengthwise of the hinged section near the lower edge thereof and secured in place by posts 51, affords a good grip for the operator when it is desired to swing the hinged casing section into the fully open position.

The mechanism for holding the lower edges of the casing sections in tight engagement during the mixing operation is preferably constructed as follows: On the lower outer surface of the hinged section 30 near the edge thereof is a longitudinal series of lugs 52 in which is mounted a longitudinal rock shaft 53. This shaft carries a plurality of swinging latch levers 54 that are adapted to cooperate respectively with lugs 55. These lugs 55 are cast on the lower outer surface of the fixed casing section. In the form shown, three latch levers 54 are provided, each being fixedly mounted on shaft 53 between two of the lugs 52; and the lugs 55 are also three in number. The levers 54 have hub portions 54ª on the shaft and substantially parallel arm portions 54ᵇ that extend on both sides of or straddle the corresponding lug 55 on the fixed casing section. The rear surfaces of the lugs 55 are slightly curved and are adapted to be engaged by rollers 56 carried by the respective levers 54. Each of the rollers 56 is mounted to rotate freely on a pin 57 passing through and secured in registering openings in the free end portions of the lever arms 54ᵇ. In the particular form shown, each of the two latch levers 54 at the ends of the machine is provided with an operating extension 58, having a foot piece 59 extending forwardly from the under portion of the machine beneath the handle bar 50, previously described. Each of the levers 54 is rigidly fixed to the rock shaft 53 and hence it will be understood that when one of the foot pieces or treadles 59 is raised or lowered, all of the latch levers will be swung down or up, as the case may be. The meeting edges of the lower parts of the two casing sections are adapted to snugly engage with each other, and a longitudinal projection 61 set into the edge of one section is tightly wedged into a corresponding groove 62 in the edge of the other section so as to form a snug rabbeted joint which effectively prevents the leakage of any material out of the working chamber during the mixing. The latching mechanism, just described, is held in the latching position, preferably by additional means which constitutes locking mechanism for preventing the disengagement of the rollers from the rear faces of the lugs 55. In the particular form shown, the locking mechanism comprises a longitudinal shaft 63 journalled in the end frames of the machine at the rear portion thereof and slightly at the rear of the fixed lugs 55. Fixed to this shaft 63 are cams 64 corresponding in number to the rollers 56 and aligned with said rollers and adapted to be brought into contact therewith by manually operated means. In the form shown, the manually operated means for shifting the cams 64 comprises a worm shaft 65 arranged transversely of the machine and journalled in the right hand end frame or standard 21 (Figs. 1 and 2). At the rear end of the shaft 65, the same is provided with a worm 66 engaging a worm wheel 67 on one end of the shaft 63. On the front end of the worm shaft 65 is a hand wheel 68, whereby the same may be turned manually from the front of the machine. When the hand wheel is turned in one direction, the cam shaft 63 with the cams 64 thereon is rocked in its bearings to move the cams into engagement with the rollers 56 when the latter are locked back of the lugs 55; and when the hand wheel is turned in the other direction, the cams 64 are swung down to disengage the rollers, as shown in Fig. 5. When the parts are in the locked position, the latch levers cannot be accidentally disengaged from the fixed lugs owing to the fact that the cam shaft is locked in place through the interengagement of the worm 66 and worm wheel 67. When it is desired to open the casing, the cams 64 are swung downwardly into the position shown in Fig. 5, so as to permit downward swinging movement of the levers 54 to disengage the lugs 55. This downward swinging movement of the levers 54 may take place by gravity, but if the levers should stick they can be readily released by kicking or pushing in an upward direction on one of the lever extensions 59. As soon as the rollers 56 disengage the lugs 55, the hinged casing section swings to the open position shown in Fig. 5, under pressure of the material being treated, which is then discharged through the open lower portion of the casing. When the batch of material has been completely discharged, the working chamber is closed automatically by the counterweight means. One of the latch lever extensions 59 is then pressed downwardly by the foot of the operator for the purpose of engaging the latch levers with their cooperating lugs. It will be understood that we do not limit ourselves in all aspects of the invention to the particular lock and latch device shown wherein a cam or like device is operative on a latching device, as the means provided for interlocking the two casing sections may be considerably varied without departing from the scope of our invention.

Beneath the chamber and in line with the discharge of the material therefrom there are mounted two sheeting rolls 69 secured upon shafts 70, which are journalled in the frames or supporting pedestals 22, as shown at 71 in Fig. 3. Upon one end of each of the shafts 70 is secured a gear 72. These gears are constantly enmeshed so that one of these shafts will be driven from the other. As shown in Figs. 1 and 3, the gears are provided upon the left hand ends of the shafts.

To drive the rolls from the rotor, there is provided a connection between one of these shafts 70 and the rotor shaft. This connection may be provided by extending one end of one of the shafts 70 and mounting a gear 73 on this extended end, which gear is in mesh with a large gear 74 keyed upon the rotor shaft. The gear 73 in the form of drive shown is loose upon the shaft 70 and is retained in position by a shoulder 74$^a$, provided by reducing the end of the shaft, and a collar 75 secured upon the shaft at the opposite side of the gear from that on which the shoulder is located. A clutch face 76 is provided at one side of the gear 73 and is adapted to cooperate with a clutch face 77 provided upon a clutch member 78, which is slidably feathered to the shaft 70. This clutch member is adapted to be moved along the shaft by a lever 79 secured upon a rock shaft 80, which is journaled in one of the side frames 22. This rock shaft is provided with a downwardly extending arm 81, which terminates in a yoke 82, the arms of which are provided with pins 83 extending into a groove 84 in the clutch member 78. It will be apparent that when the arm 79 is oscillated, the clutch member 78 will be moved along the shaft and will serve to clutch the gear 73 to the shaft when desired, so that this shaft 70 will be driven from the rotor shaft.

It will be found desirable at times to so connect this clutch shifting means with the discharge controlling means of the chamber, that when the chamber sections are allowed to swing apart to discharge the material, the sheeting rolls will be automatically set into operation. Such an arrangement may be conveniently provided by securing a pulley 85 upon the end of the shaft 63 upon which are mounted the lugs 64, which serve to retain the swinging section of the chamber in closed position. This pulley 85 is provided with a cam groove 86, which receives an arm 87 secured upon the shaft 80. When the hand wheel 68 is turned to rotate the shaft 63 to swing the lug 64 to the position shown in Fig. 5 so that the latch members 54 may be released and the section 30 swing to discharging position, the cam groove 86 in the pulley which is secured upon this shaft 63 will serve to move the arm 87, which will rock the shaft 81 and move the clutch member into engaging position to drive the shafts 70.

The grooved pulley 85 is provided with a broken away portion 89, which may be arranged to lie just opposite the finger 87 when the sections of the mixing chamber are closed. The lever 79 and its associated shaft can now be moved independently of the shaft 63 and the pulley 85, so that the shifting rolls can be set into operation, when desired, by the lever 79, which may be freely moved by the operator when the member 87 lies opposite the broken away portion of the grooved pulley. It will be apparent that with this arrangement the sheeting rolls may be set into operation automatically by the opening of the chamber, or may be set into operation by the operator of the rubber mixer, when he desires. Furthermore, it will be understood that we do not wish to limit ourselves to the particular form of a driving means for the sheeting rolls or the particular form of clutch means to connect the shaft of one of the sheeting rolls to the rotor shaft. The gear 74 may, if desired, be mounted loosely upon the rotor shaft and the gear 73 be secured upon the roll shaft. The clutch member would then be mounted upon the rotor shaft so as to clutch the gear 73 thereto when it is desired to drive the sheeting rolls.

In Fig. 6 we have shown a somewhat modified form of sheeting device in which one of the sheeting rolls 91 is disposed at a level above the associated roll 92. These rolls, as shown, discharge the sheeted rubber upon a supporting table or the like 93, which is provided with a curved portion 94, which is adapted to lie in close contact with one of the rolls, preferably the lower one and strip the material therefrom. The table 93 will in this case serve as a support and carrier for the sheet of rubber discharged from the machine.

In Fig. 7 we have also shown a discharging and sheeting device in which one of the sheeting rolls 95 is disposed above the associated roll 96. A conveyor 97 is trained around the roll 96 and a roll 99 which is mounted at a point at some distance from the machine where it is desired to convey and discharge the sheeted rubber. The rubber material is carried in the form of sheets upon the conveyor 97 and is discharged over the conveyor roll 99 upon a table or support 100, which is placed adjacent this roll. A stripper 101 may be mounted upon the table to strip the material from the conveyor 97.

The sheeting rolls and associated structure shown in Figs. 6 and 7 are positioned to direct, laterally, the material discharged from the chamber and to carry it laterally to a remote point where it may be discharged at a place convenient for other operations.

The operation of the machine is substantially as follows:

The material is fed into the chamber through the hoppers at the ends thereof, and when thoroughly mixed and compounded by the action of the rotor, the same is ready to be discharged.

The chamber section 30 being closed, as shown in Fig. 2 of the drawings, suppose it is desired to discharge the contents of the chamber. The hand wheel 68 is then rotated which movement through the worm 66 will cause the rotation of the shaft 63 and remove the lugs 64 from contact with the rolls 56 and allow the chamber sections 30 to swing to the position shown in Fig. 5. At the same time the rotation of the shaft 63 will, through the grooved pulley, cause the rock shaft 80 to be rocked by the finger 87 to cause the engagement of the clutch face 77 with the clutch face 76. The sheeting rolls will then be thrown into operation and will be rotated from the rotor shaft through the gears 73 and 74 and the gears 72. The contents of the chamber will then be discharged in sheet form from the sheeting rolls 69. While the automatic operation of the clutch 78 to start the rolls has been described, it will, of course, be apparent that the operator may, by the movement of the lever 79, throw the clutch members into engagement and start the rolls at any time he desires. It will be found that we have provided a very convenient and satisfactory arrangement for controlling the rotation of the sheeting rolls from the rotor shaft and at the same time have provided an efficient and satisfactory means extending throughout the length of the mixing chamber to cooperate with the discharging means to deliver the material from the chamber in sheeted form.

When the hand wheel 68 is rotated to return the lugs 64 to locking position, the reverse rotation of the pulley 85 will rock the shaft 80 to disengage the clutch and automatically stop the rotation of the rolls.

The material which is being discharged from the chamber will be gripped by the sheeting rolls and will be pulled or drawn from the chamber by these rolls. The sheeting rolls, therefore, will act as a discharge device for the mixing chamber, and at the same time, the mixing device will serve as a feeder for the sheeting rolls, so that the material will pass from the chamber to the rolls and be discharged therefrom without the assistance of the operator of the machine. The discharge of the chamber will be expedited by the use of the long rolls which extend throughout the length of the same and there will be no tendency for the rolls to be stopped or choked by the material passing through the same on account of long operating surface which is presented by them. While the chamber which is shown in the drawings in connection with this application is one composed of longitudinal sections which swing apart to discharge the improvements which we have made are not limited to this kind of a chamber, as it is apparent that various other discharging devices may be used. Moreover, our improvements are not limited to a chamber which discharges throughout its length or which has a discharge opening as long as the length of the sheeting rolls has, for although the chamber may have a small discharge opening, it is desirable to have long rolls which will present an operating surface large enough to take care of the material discharged without any likelihood of the rolls being crowded or choked by the same. Moreover, while we have shown a driving connection between the rotor shaft and one of the roll shafts, it is obvious that the rolls may be driven from any driving shaft which can be suitably connected to one or both of the roll shafts.

While we have shown and described in detail a preferred form of our invention, it is to be understood that the same is not to be limited thereto in all of its details, but many variations and modifications may be made therein without departing from the spirit of the invention or from the scope of the appended claims.

We do not claim in this application a rubber mixing or compounding machine having means for drawing the compound material from the mixing chamber and discharging it in sheet form, or other features of construction claimed in our application, Serial No. 556,128 renewed April 22, 1922; nor do we claim broadly herein a rubber working machine consisting of a single cylinder and a rotor therein for working the material back and forth, as claimed in our application, Serial No. 458,222, filed April 4, 1921.

What we claim is:

1. A rubber working machine having a chamber, a rotor therein, a shaft for driving the rotor, sheeting rolls disposed below the chamber and adapted to be driven from the rotor shaft said chamber being provided with a movable section to enable the material to be discharged therefrom, means to latch said section in closed position, and means to automatically set said sheeting rolls in operation prior to the unlatching of said discharge section.

2. A rubber working machine, having a chamber, a rotor therein, a shaft for the rotor, means to open the chamber to discharge material therefrom, sheeting rolls disposed below said chamber, and automatically operating means to drivingly connect said sheeting rolls to the rotor shaft prior to the opening of said discharge means.

3. A rubber working machine having a mixing chamber, means to discharge material therefrom, sheeting means associated with said chamber, and means controlled by the discharge of the chamber to set said sheeting means into operation.

4. In a rubber mixer, a mixing chamber, means to control the discharge thereof, normally idle sheeting rollers associated with said chamber, a drive shaft, and means, operated by said discharge control means, to operably engage said sheeting rolls with said drive shaft.

5. In a rubber mixer, a mixing chamber, means to discharge said material therefrom in sheet form, and automatically operable means to set said sheeting means into operation.

6. In a rubber mixer, a mixing chamber, and sheeting rolls to discharge material therefrom in sheet form and a carrier trained around one of said rolls to direct the discharge material in a lateral direction.

7. In a rubber mixer, a mixing chamber and sheeting rolls to discharge material therefrom in sheet form, one of said rolls being spaced downwardly with relation to the other to direct the material in a lateral direction.

8. In a rubber mixer, a mixing chamber and sheeting rolls to discharge material therefrom in sheet form, said rolls being disposed at different heights to direct the discharged material in a lateral direction.

9. In a rubber mixer, a mixing chamber and sheeting rolls to discharge material therefrom in sheet form, one of said rolls being spaced downwardly with relation to the other to direct the material in a lateral direction, and supporting means to receive the material when discharged laterally by the rolls.

10. In a rubber mixer, a mixing chamber and sheeting rolls to discharge material therefrom in sheet form, said rolls being disposed at different heights to direct the discharged material in a lateral direction and a conveyor trained about one of said rolls to carry the material in a lateral direction to a point remote from the chamber.

11. In a rubber mixer, a mixing chamber, a hinged closure member adapted to swing to open position to permit the discharge of the chamber, sheeting rolls positioned below said chamber, means to secure said swinging closure in closed position, and means controlled by the release of said closure to set said sheeting rolls into operation.

12. In a rubber mixer, a mixing chamber, a rotor therein and a shaft to drive the rotor, said chamber being provided with a swinging discharge section, means to hold said section in closed position, sheeting rolls below the chamber, and means automatically controlled by the release of said swinging section to drivingly connect said sheeting rolls with the rotor shaft.

In witness whereof, we have hereunto set our hands on the 30th day of December, 1920.

DAVID REES BOWEN.
CARL F. SCHNUCK.